(12) United States Patent
Park et al.

(10) Patent No.: US 8,311,567 B2
(45) Date of Patent: Nov. 13, 2012

(54) METHOD FOR MANAGING PRE-ESTABLISHED SESSION, POC SYSTEM AND POC USER EQUIPMENT FOR IMPLEMENTING THE SAME

(75) Inventors: Sung-Jin Park, Suwon-si (KR); Ji-Hye Lee, Seoul (KR); Wuk Kim, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/405,901

(22) Filed: Feb. 27, 2012

(65) Prior Publication Data

US 2012/0157149 A1 Jun. 21, 2012

Related U.S. Application Data

(63) Continuation of application No. 12/098,816, filed on Apr. 7, 2008, now Pat. No. 8,145,250.

(30) Foreign Application Priority Data

Apr. 6, 2007 (KR) .......................... 10-2007-0034435
Jun. 8, 2007 (KR) .......................... 10-2007-0056345

(51) Int. Cl.
*H04W 4/10* (2009.01)
*H04W 4/08* (2009.01)
(52) U.S. Cl. ........................ 455/519; 455/520
(58) Field of Classification Search ............... None
See application file for complete search history.

(56) References Cited

U.S. PATENT DOCUMENTS

| 7,899,444 | B2 | 3/2011 | Hans et al. | |
|---|---|---|---|---|
| 8,145,250 | B2 * | 3/2012 | Park et al. | 455/519 |
| 2005/0143056 | A1 | 6/2005 | Iyer et al. | |
| 2006/0040695 | A1 | 2/2006 | Yoon et al. | |
| 2006/0111134 | A1 | 5/2006 | Mills | |
| 2006/0223563 | A1 | 10/2006 | Sung et al. | |

FOREIGN PATENT DOCUMENTS

| JP | 2006-287940 A | 10/2006 |
|---|---|---|
| WO | 2006/052109 A1 | 5/2006 |
| WO | 2006/054857 A1 | 5/2006 |
| WO | 2006/075873 A1 | 7/2006 |
| WO | 2006/109971 A1 | 10/2006 |
| WO | 2007/042079 A1 | 4/2007 |

OTHER PUBLICATIONS

OMA PoC System Description, Open Mobile Alliance, XP 050256107, Jun. 21, 2006, 225 pages, vol. SA WG2, Sophia-Antipolis Cedex, France.

* cited by examiner

*Primary Examiner* — Philip Sobutka
(74) *Attorney, Agent, or Firm* — Jefferson IP Law, LLP

(57) ABSTRACT

Disclosed is a method for enabling a terminating-side Push-To-Talk (PTT) over Cellular (PoC) client to open a PoC session by using a pre-established session, and to maintain the pre-established session when the terminating-side PoC client terminates the open PoC session, and a PoC system and a PoC User Equipment (UE) for implementing the same. To this end, a REFER BYE message is used to terminate the PoC session while keeping the pre-established session maintained. The REFER BYE message must include information, such as pre-established session parameter information, a session IDentifier (ID), etc. Also, the REFER BYE message is transmitted from the PoC client to the PoC server, and the PoC server receives the REFER BYE message, checks the contents of a header in the received message, and terminates the PoC session while keeping the pre-established session maintained when a specified condition is satisfied.

16 Claims, 10 Drawing Sheets

METHOD FOR MANAGING PRE-ESTABLISHED SESSION, POC SYSTEM AND POC USER EQUIPMENT FOR IMPLEMENTING THE SAME

PRIORITY

This application is a continuation of prior application Ser. No. 12/098,816, filed Apr. 7, 2008, which claims the benefit under 35 U.S.C. §119(a) of a Korean patent application filed in the Korean Intellectual Property Office on Apr. 6, 2007 and assigned Serial No. 10-2007-0034435, and a Korean patent application filed in the Korean Intellectual Property Office on Jun. 8, 2007 and assigned Serial No. 10-2007-0056345, the entire disclosures of each of which are hereby incorporated by reference.

BACKGROUND OF THE INVENTION

1. Field of the Invention

The present invention relates to a method for managing a pre-established session, a Push-To-Talk (PTT) over Cellular (PoC) system and PoC User Equipment (UE) for implementing the same. More particularly, the present invention relates to a method for enabling a pre-established session to be maintained when a PoC client in a terminating side opens a PoC session using the pre-established session and terminates the open PoC session, a PoC system and a PoC UE for implementing the same.

2. Description of the Related Art

Significant development of mobile communication technologies and the expansion of communication networks have led to the provision of various services and applications which use mobile telephones. In addition to basic communication services, users are demanding more diversified services, including a positioning service, a multimedia service, and a Push-to-Talk (PTT) service. In particular, the PTT service supports various supplementary functions, such as instant messenger, status display, and a voice/multimedia storing service, as well as group and voice communications which have been provided by conventional radio transmitters or Trunked Radio Systems (TRSs).

Currently, various efforts are being made in the industry to standardize a PTT-over-Cellular (PoC) service which employs a PTT function in a mobile communication network. One feature of the PoC service, which draws a distinction between the PoC service and the conventional mobile communication service, is that the user can perform communications while moving between sessions, if necessary, because he/she belongs to a plurality of sessions. The requirement that the user must be able to communicate while moving through a plurality of PoC sessions is specified by the Open Mobile Alliance (OMA), which is an organization regulating pertinent mobile communication services.

Meanwhile, in order to make use of the PoC call service, a PoC client registers his/her PoC address with a Session Initiation Protocol (SIP)/Internet Protocol (IP) core. Then, the SIP/IP core stores information about the PoC client according to the request of the PoC client. Thus, when another PoC client tries to request a PoC group call, the PoC client registers his/her information in the SIP/IP core network in advance, as described above, and requests the PoC group call to his/her SIP/IP core network by using group identification information received from a PoC Extensible Markup Language (XML) Document Management Server (XDMS). Then, the SIP/IP core performs address determination and domain location determination procedures by using information on the PoC client which has transmitted the call request, and then transfers the PoC call request to a home PoC server with which the call requesting PoC client has been registered. The PoC server prepares to open a PoC session in response to the PoC communication request, acquires the requisite client information from the PoC XDMS server, and transfers communication request signals to the corresponding SIP/IP core network. In this case, when the communication request signal corresponds to a communication request for clients within an intradomain, the PoC server performs both a Participating PoC Function (PF) and a Controlling PoC Function (CF).

The PoC server, which manages a call-requested PoC client, requests a PoC call to the PoC client, after the SIP/IP core network performs the location determination procedure, by using information about the PoC client that is received by the PoC server. When the PoC-call-requested PoC sends an OK response to the PoC client who has requested the call, a PoC communication begins. When PoC communication is not started due to the status of a counterpart PoC client, the PoC client can store the user's voice and/or media to be transmitted in a PoC box.

Meanwhile, call processing technology for PoC communication establishment, which makes communication possible according to a communication request as described above, may have various procedures depending on requirements and statuses of originating and terminating sides. Required characteristics of a PoC system according to the requirements and statuses of the originating and terminating sides, based on the OMA, are as follows:

First, the terminating side can establish its own answer mode according to the request of a PoC client, in which the answer mode may be classified into an auto-answer mode and a manual answer mode.

In the auto-answer mode, the answer is immediately transmitted from an associated network to the transmitting side instead of the receiver being manually answered when the originating side is included in a PoC client list designated by the terminating-side PoC user. The network can automatically send the answer on behalf of the UE, as described above, because the PoC server has a function of storing an answer mode and an associated user list according to an answer-mode setting request of the UE. Meanwhile, the manual answer mode is used when it is unclear who an associated user is or if the user is not included in the user list corresponding to the automatic answer mode, or when the receiver sets the manual answer mode for all users, in which a PoC communication request is transmitted to the UE through a reception network and the communication is connected after the PoC client's permission.

Second, the PoC system classifies session modes into on-demand and pre-established session modes according to whether a connection has been established between the PoC client and the PoC server belonging to the user's home network.

The on-demand session mode corresponds to when no pre-established session has been established by a PoC client, in which the PoC client performs a procedure for connecting a PoC call after receiving an invitation message from another PoC client.

Meanwhile, in the pre-established session mode, a specified session is pre-established by the PoC client between the PoC client and the PoC server belonging to the user's home network, according to the request of the PoC client. Such a pre-established session is necessary to negotiate media parameters to be used by the PoC client with the PoC server in advance so that a session can be quickly established without renegotiation for the media parameters to be used between the PoC server and the PoC client in the future. For setting a pre-established session, a PoC client provides media parameters supportable through a Session Description. Protocol (SDP) body using a SIP INVITE method, and responds to media parameters provided from the server, in which a response message from the server includes identification information of a newly pre-established session and a conference Uniform Resource Identifier (URI). When such a pre-established session is used, it is possible to pre-establish an IP address, a port number, a codec to be used, and a talk burst control protocol. That is, in the PoC service, a pre-established session is created and maintained to rapidly open a PoC session. When a pre-established session is opened, parameters, such as an IP address, a port number, a codec, etc., are negotiated between a PoC client and a PoC server in advance. Accordingly, when a response is received after a REFER message has been sent to open a PoC session, or when a response is sent after an INVITE message has been received, the parameters are used to open a PoC session, so that it is possible to reduce a period of time required for establishment of the session.

A conventional signal flow for establishing a pre-established session between a PoC client and a PoC server will now be described with reference to FIG. 1.

In steps 100 and 102, PoC client A transmits an INVITE message, which is a message for the establishment of a pre-established session, to PoC server A through SIP/IP core A. Thereafter, in steps 104 and 106 the PoC server A transmits an OK message to the PoC client A through SIP/IP core A in response to the INVITE message.

A conventional signal flow for opening a PoC session between the PoC client and the PoC server in the state in which the pre-established session has been established as described above will now be described with reference to FIG. 2.

When the PoC client A is to open a PoC session by using the pre-established session, the PoC client transmits a REFER message for opening the PoC session to the PoC server A through the SIP/IP core A in steps 200 and 202. In this case, the PoC client A opens the PoC session with the pre-established session that has been maintained, that is, by using a Call IDentifier (ID) of an SIP session between the PoC client A and a PoC server (i.e., a participating PoC function unit), which performs a participant management function, as a pre-established session ID.

Thereafter, the PoC server performs an operation for inviting PoC clients invited to the corresponding PoC session in step 203, and transmits an ACCEPTED message to the PoC client A through the SIP/IP core A in response to the REFER message in steps 204 and 206.

Thereafter, when receiving a first invitation permission response from a specific PoC client in step 208, the PoC server A transfers a PoC session ID to the PoC client A through a floor connection (i.e. Talk Burst connection) message in step 209.

Then, the PoC client A transmits a floor acknowledgement (i.e. Talk Burst Acknowledge) message to the PoC server A in step 210, and the PoC server A transmits a floor confirmation (i.e. Talk Burst Confirm) message to the PoC client A in step 212. Thereafter, the PoC client A transmits Real-time Transport Protocol (RTP) media to the PoC server A in step 214.

Meanwhile, when the PoC server A receives a response to the invitation from another PoC client in step 215, the PoC server A transmits a NOTIFY message to the PoC client A through the SIP/IP core A in steps 216 and 218. Then, the PoC client A, having received the NOTIFY message, transmits an OK message to the PoC server A through the SIP/IP core A in steps 220 and 222.

Hereinafter, a conventional signal flow for a procedure of terminating a PoC session with a maintained pre-established session when both an originating side and a terminating side are in the auto-answer mode will be described with reference to FIG. 3.

First, when PoC client A is to terminate a PoC session in a state in which the PoC session has been established as shown in step 300, the PoC client A transmits a REFER BYE message, which requests the PoC session to be terminated, to PoC server A in steps 302 and 304. In this case, the PoC client A stores an ID and a media parameter of a PoC server of a PF and an ID and a media parameter of a PoC server of a CF. Therefore, the PoC client A transmits a REFER BYE message using the two IDs, so that the ciphering can terminate the PoC session with the pre-established session that has been maintained.

Then, the PoC server A transmits an ACCEPTED message in response to the REFER BYE message to the PoC client A in steps 306 and 307.

Thereafter, the PoC server A transmits a BYE message, which requests a session to be terminated, through SIP/IP cores to PoC server X in steps 310, 312 and 314. The PoC server X, which has received the BYE message, transmits an OK message through the SIP/IP cores to the PoC server A in response to the BYE message in steps 316, 318 and 320. Thereafter, the PoC server A transmits a NOTIFY message through the SIP/IP core A to the PoC client A in steps 322 and 324, and the PoC client A, having received the NOTIFY message, transmits an OK response message through the SIP/IP core A to the PoC server A in steps 326 and 328.

Then, the PoC server A terminates the PoC session, while maintaining the pre-established session in steps 330, 332 and 333.

That is, the conventional method for terminating a PoC session with a pre-established session that has been maintained can be only performed by an originating side.

Hereinafter, a conventional signal flow for the opening of a PoC session between a PoC client and a PoC server when a terminating side is in a manual answer mode will be described with reference to FIG. 4. First, it is assumed that a pre-established session has been established between PoC server B (PF entity) and terminating-side PoC client B. When receiving an INVITE message from PoC server A (CF entity) having a session control function in step 400, the PoC server B (PF entity) transmits a re-INVITE message to the terminating-side PoC client B in step 402. In this case, when the PoC server B (PF entity) performing a participant management function transmits the re-INVITE message, the PoC server B inserts a PoC session ID into conference URI information, thereby changing a PoC session contact address of the PoC client from an existing pre-established session ID to the PoC session ID.

The PoC client B, having received the re-INVITE message, transmits an alerting message to the PoC server A through the PoC server B in steps 404 and 406. In this case, since the PoC client B has received the re-INVITE message including the PoC session ID in place of the existing pre-established session ID, the PoC client B cannot have information about a pre-established session ID any more. In addition, the terminating-side PoC client B transmits a 200 OK message to the PoC server A (CF entity) in steps 408 and 410.

As described above, in the case where a terminating-side PoC client is in the manual answer mode using the pre-established session, when the PoC server B (PF entity) performing the participant management function in the terminating side transmits a re-INVITE message, the PoC server B inserts a PoC session ID into a Contact header according to an SIP mechanism defined in the SIP mechanism Request For Comments (RFC) [3261], so that the PoC session contact address of the PoC client is changed from an existing pre-established session ID to a PoC session ID. The entire disclosure of RFC [3261] is hereby incorporated by reference. Accordingly, the PoC client will no longer have information about the pre-established session ID.

SUMMARY OF THE INVENTION

An aspect of the present invention is to address at least the above-mentioned problems and/or disadvantages and to provide at least the advantages described below. Accordingly, an aspect of the present invention is to provide a method of storing a pre-established session IDentifier (ID) and media parameters when a terminating-side Push-To-Talk (PTT) over Cellular (PoC) client opens a PoC session using a pre-established session, and terminating the PoC session while keeping the pre-established session maintained by using the stored pre-established session ID.

In accordance with an aspect of the present invention, a PoC system for managing a pre-established session is provided. The system includes a first PoC server for performing a session control function, a second PoC server for receiving a PoC session invitation request message from the first PoC server, determining if there is a pre-established session between the second PoC server and a terminating-side PoC client, and transmitting a PoC session re-invitation request message to the terminating-side PoC client after storing a pre-established session ID and a corresponding media parameter when it has been determined that there is the pre-established session, and the terminating-side PoC client for storing the pre-established session ID and the corresponding media parameter when a PoC session ID included in the transmitted PoC session re-invitation request message is identical to the pre-established session ID, and generating a PoC session termination request message by using the PoC session ID and the pre-established session ID and transmitting the PoC session termination request message to the second PoC server upon terminating the PoC session.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

First, a Push-to-Talk (PTT) over Cellular (PoC) system to which exemplary embodiments of the present invention are applied will now be described with reference to FIGS. 5 to 7. The following description will be given with respect to an example in which exemplary embodiments of the present invention are applied to a PTT system, especially to a PoC system which provides a PTT service through a cellular mobile communication network. Generally, a PoC system uses a session initiation protocol (SIP) and an SIP extension protocol in order to transfer session participation information for group communication, and uses an Extensible Markup Language (XML) Configuration Access Protocol (XCAP) in order to acquire group information. The following exemplary embodiment of the present invention may be implemented with the aforementioned protocols, and the basic construction of the exemplary embodiments of the present invention may be based on the PoC Rel. 1 system, the entire disclosure of which is hereby incorporated by reference. First, the following description will be given with respect to a PoC system, to which exemplary embodiments of the present invention can be applied.

Figure 1:
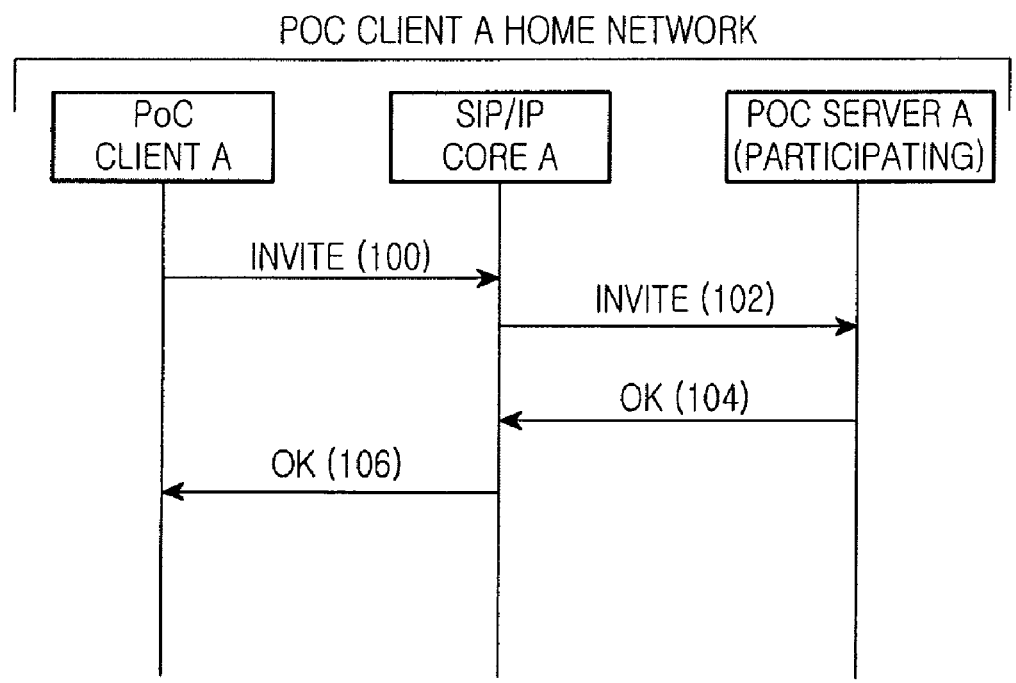
FIG. 1 illustrates a conventional flow of signals for a pre-established session between a Push-To-Talk (PTT) over Cellular (PoC) client and a PoC server.
Figure 2:
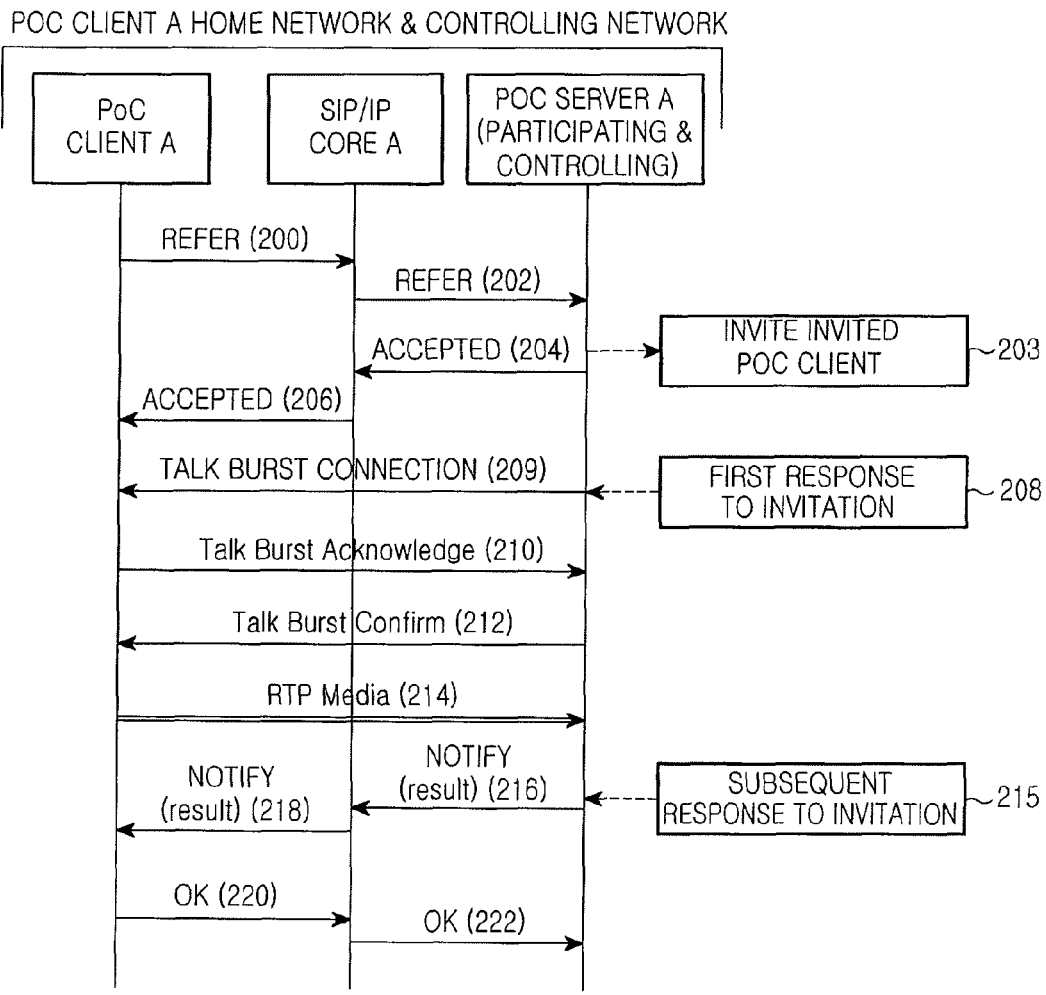
FIG. 2 illustrates a conventional flow of signals for opening a PoC session using a pre-established session between a PoC client and a PoC server.
Figure 3:
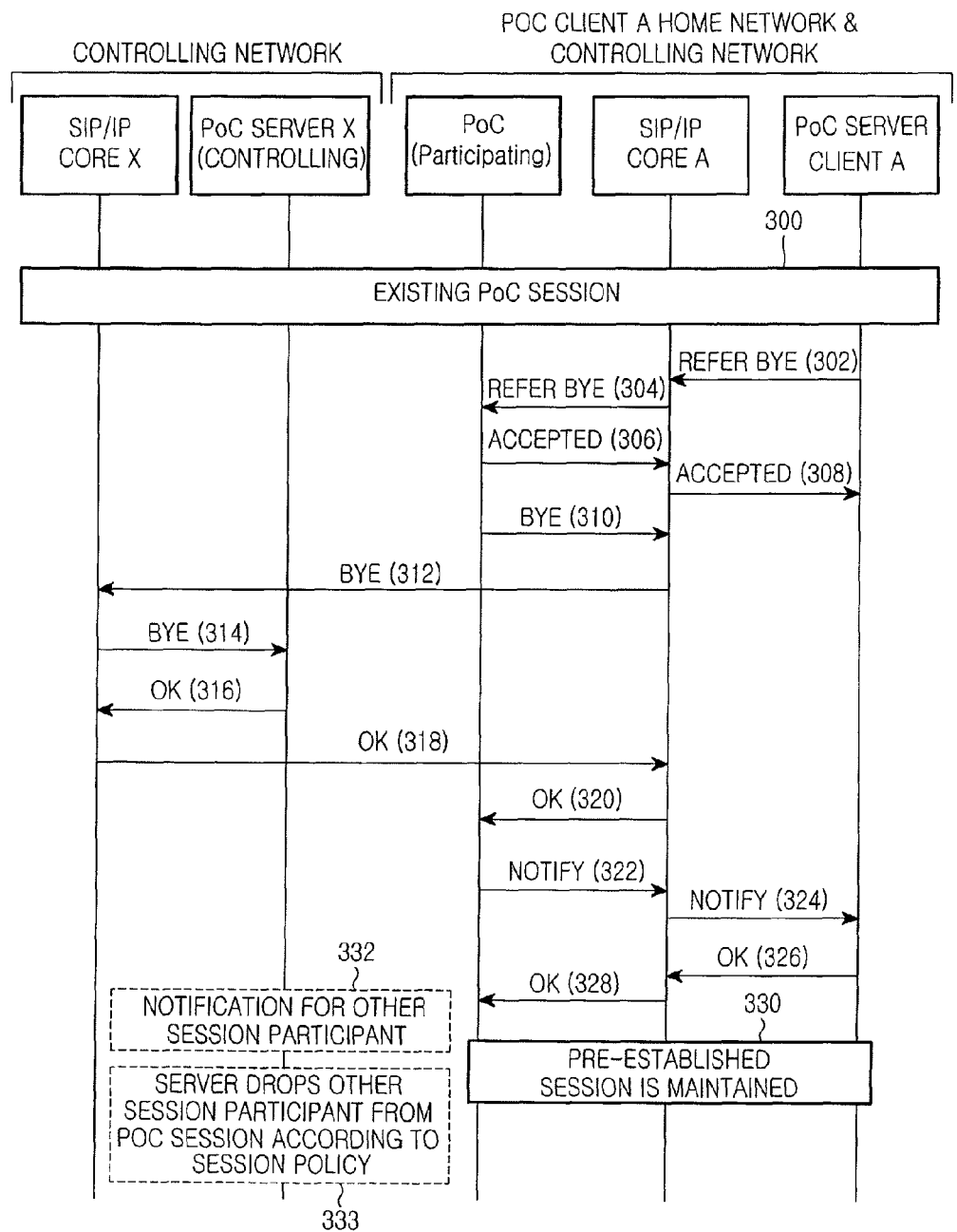
FIG. 3 is a flowchart illustrating a conventional procedure for terminating a PoC session with a pre-established session maintained when both an originating side and a terminating side are in the auto-answer mode.
Figure 4:
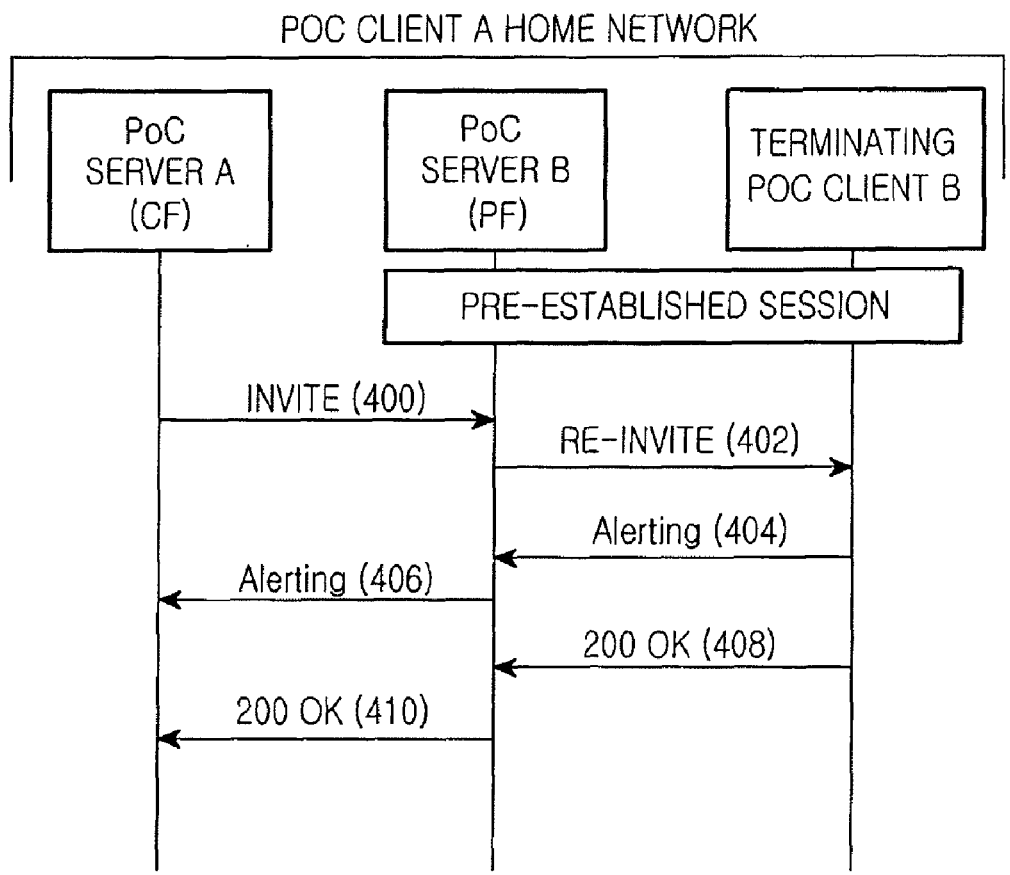
FIG. 4 is a flowchart illustrating a conventional procedure for opening a PoC session when a terminating side is in a manual answer mode.
Figure 5:
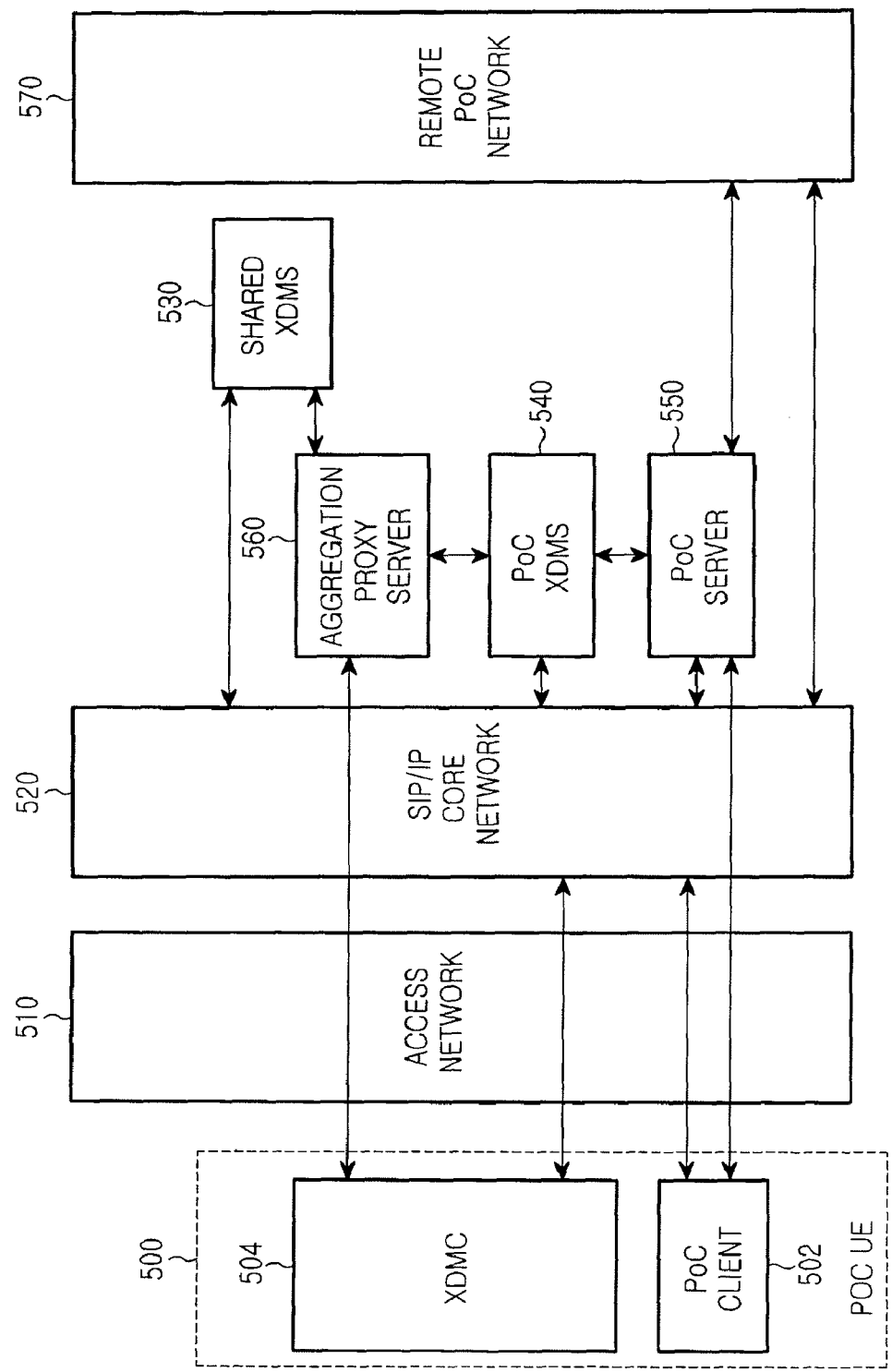
FIG. 5 is a block diagram illustrating a PoC system to which exemplary embodiments of the present invention are applied.

FIG. 5 is a conceptual view illustrating the configuration of a PoC service system and a relative network, to which exemplary embodiments of the present invention are applied.

The PoC system, to which exemplary embodiments of the present invention are applied, may include a PoC User Equipment (UE) 500, Extensible Markup Language (XML) Document Management Servers (XDMSs) 530 and 540, and a PoC server 550. In addition, the PoC system may further include an aggregation proxy server 560. The components may be connected to each other through an access network 510, an SIP/IP core network 520 and a remote PoC network 570.

The respective components will now be described.

The PoC UE 500 may include a PoC client 502 and an XML Document Management Client (XDMC) 504.

The PoC client 502, which represents a service requester included in the PoC UE 500, performs network access to provide a PoC service subscriber with a PoC service while residing in the PoC UE 500. The PoC service subscriber may be provided with a PoC service through the PoC UE equipped with the PoC client. In the following description, the "PoC client" will be used as a general term for the PoC service subscriber and the UE equipped with the PoC client. Also, the reference numeral of the PoC client will be omitted unless a specific distinction is required.

The main functions of the PoC client are to establish a PoC session, to participate in an already established session, and to terminate an established session, in view of a PoC service subscriber (i.e., a PoC user). The PoC client 502 also has the functions for creating and transmitting a talk burst, supporting an instant personal alert, and authenticating an access to a PoC service. The PoC client may be connected to the SIP/IP core network 520, which plays a crucial role in supporting SIP/IP multimedia services, through the access network 510.

The SIP/IP core network 520 is connected to the PoC server 550 and the XDMSs 530 and 540 so as to support the PoC service. In this case, the PoC server 550 can perform a controlling PoC function for maintaining and managing a PoC session, and perform a participating PoC function for participating in a PoC session established for a point-to-point communication or a multipoint communication.

Meanwhile, a PoC service may be accompanied with a group session establishment service, such as a conference communication. To this end, the OMA standard, the entire disclosure of which is hereby incorporated by reference, defines the XDMSs 530 and 540 and the XDMC 504 for a group list service. FIG. 5 shows a PoC XDMS 540 used for a PoC service and a shared XDMS 530, which can be shared, even for other service enablers. Information about a group and a group member may be stored in the XDMSs 530 and 540 through the PoC client. From a list of individuals or groups received from the XDMSs 530 and 540, the PoC client obtains information regarding PoC clients it can call. Meanwhile, creation, modification, and management of groups and group members in the XDMSs 530 and 540 may be conducted via a communication network, such as the Internet or Intranet, which can be relied on by PoC service providers. Detailed descriptions of protocols and particular contents for XML document management, such as creation, correction and deletion of a group list will be omitted.

For a group service, upon receiving a group list-related request from the XDMC 504, the aggregation proxy server 560 routes the request to the XDMSs 530 and 540 according to appropriate rules.

The PoC server 550 will now be described.

Figure 6:
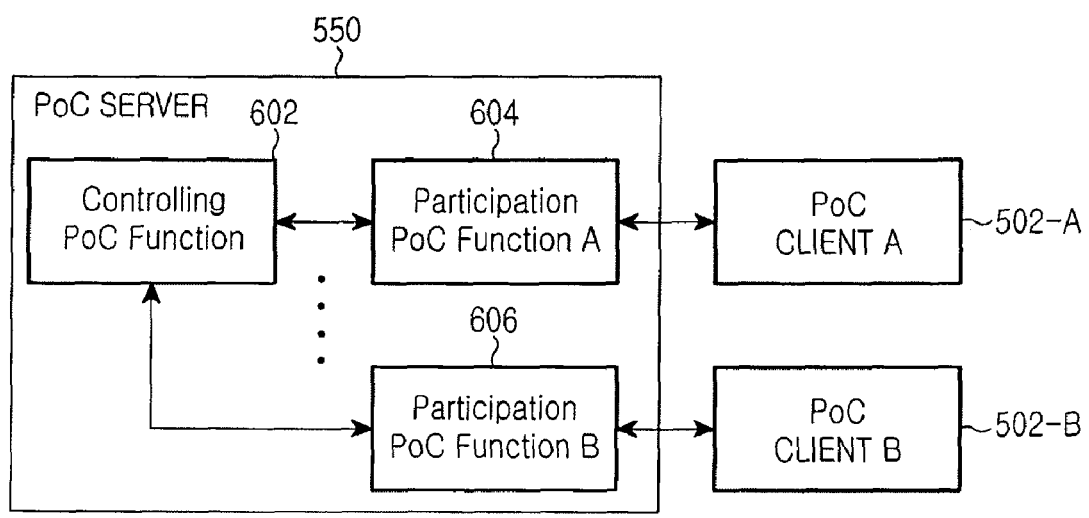
FIG. 6 is a block diagram illustrating the configuration of a PoC server.

FIG. 6 is a block diagram illustrating the configuration of the PoC server 550.

The functions of the PoC server 550 may be classified into a Controlling PoC Function (CF) 602 for generally maintaining and managing PoC sessions and a Participating PoC Function (PF) 604 and 606 for handling maintenance and management for each PoC session, such as with corresponding PoC client A 502-A and PoC client 502-B. The characteristics according to each function of the PoC server 550 will now be described with reference to Tables 1 and 2.

TABLE 1

| CF |
|---|
| Provides centralized PoC session handling |
| Provides the centralized Media distribution |
| Provides the centralized Talk Burst Arbitration functionality including talker identification |
| Provides SIP session handling, such as SIP session origination, termination, etc. |
| Provides policy enforcement for participation in group sessions |
| Provides the participants information |
| Collects and provides centralized media quality information |
| Provides centralized charging reports |
| May provide transcoding between different codecs |
| Support Talk Burst Control Protocol Negotiation |

Among the functions of the PoC server, the CF refers to the overall management of PoC sessions, as shown in Table 1. Particularly, the CF receives requests for the floor from PoC clients, arranges an order in which to give the clients the floor, and gives the clients the floor in that order. The PoC server also distributes a talk burst from a specific PoC client to all PoC clients participating in a group PoC call, and provides information about the PoC clients participating in the group PoC call.

As shown in Table 2 below, the PF is related to the management of sessions connected between the CF and each PoC client during a PoC session. Particularly, the PF relays a PoC client's request for the floor, and the floor of a PoC client given by the CF. Also, the PF provides a media relay function between the CF and the PoC client, and a transcoding function when the CF and the PoC client use different codecs. In addition, the PF provides a function for filtering one voice according to the choice of the user when voice communication is performed in a session while voice communication is being performed in another session during multiple simultaneous PoC sessions.

TABLE 2

| PF |
|---|
| Provides PoC session handling |
| May provide the Media relay function between PoC Client and Controlling PoC server |
| May provide user media adaptation procedures |
| May provide the Talk Burst control message relay function between PoC Client and Controlling PoC server |
| Provides SIP session handling, such as SIP session origination, termination, etc., on behalf of the represented PoC Client |
| Provides policy enforcement for incoming PoC session (e.g. access control, incoming PoC session barring, availability status, etc.) |
| May collect and provide media quality information |
| Provides the participant charging reports |
| May provide filtering of the media streams in the case of simultaneous sessions |
| May provide transcoding between different codecs |
| May support Talk Burst Control Protocol Negotiation |
| Stores the current Answer Mode and Incoming PoC Session Barring preferences of the PoC Client |

Figure 7:
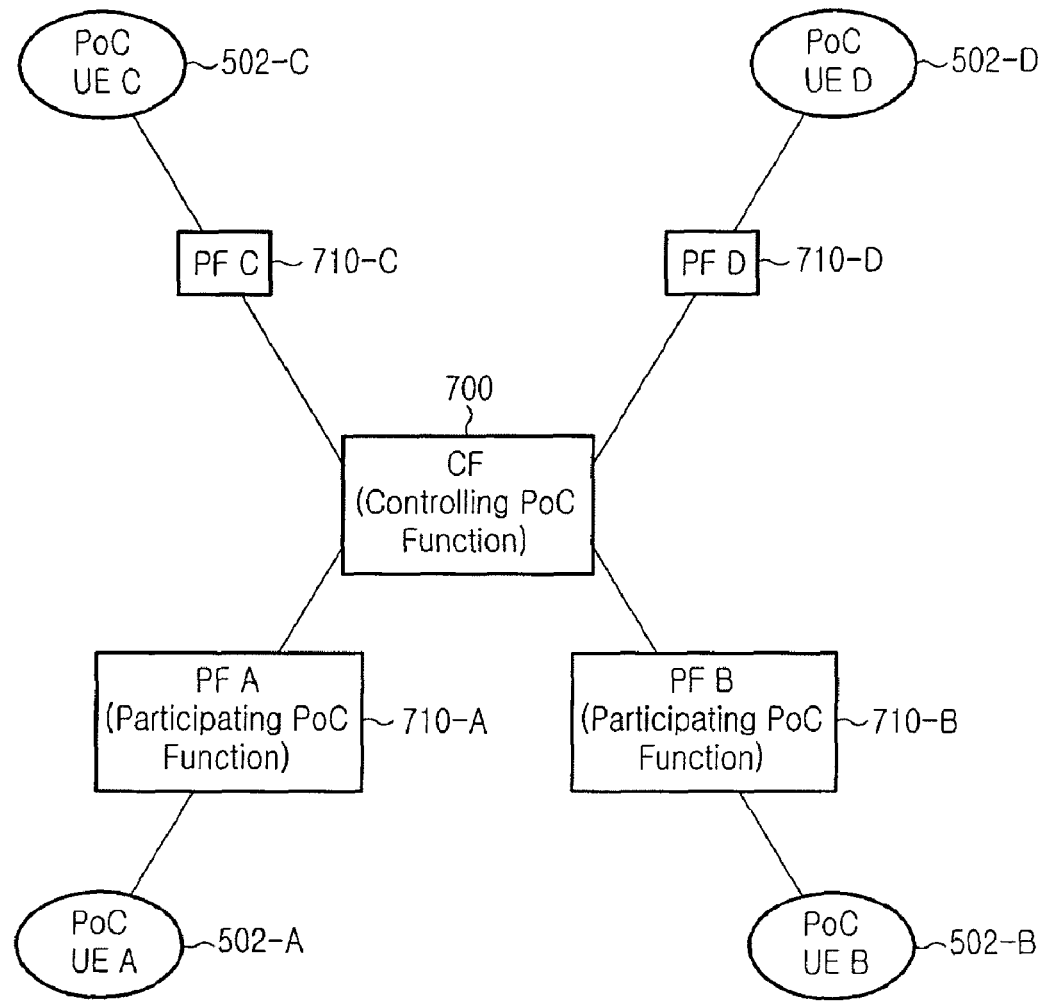
FIG. 7 is a block diagram illustrating a controlling PoC function block and a participating PoC function block in a PoC server.

FIG. 7 is a block diagram illustrating a CF entity and a PF entity of a PoC server.

PoC clients 502-A to 502-D are connected to a CF entity 700 through corresponding PF entities 710-A to 710-D, and establish respective PoC sessions. Thereafter, media for a corresponding talk burst of a PoC client that has been granted the floor from the CF entity 700, are sent to each of the other PoC clients. In this case, the PoC client that has the floor can talk only after having checked information of PoC clients participating in the group session.

Figure 8:
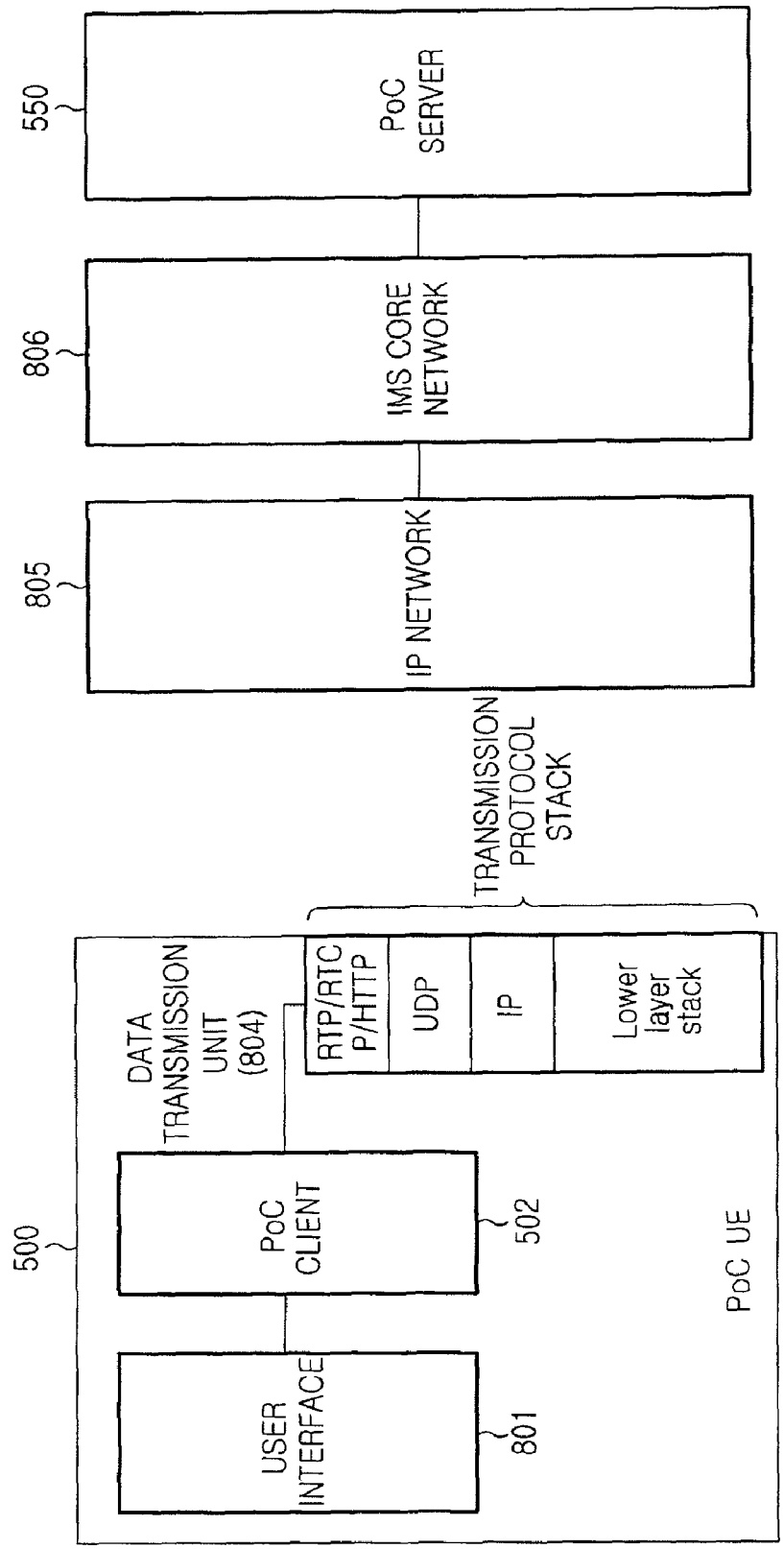
FIG. 8 is a block diagram schematically illustrating a connection between a PoC server and a PoC UE including a PoC client, to which exemplary embodiments of the present invention are applied.

FIG. 8 is a block diagram schematically illustrating a connection between a PoC server 550 and a PoC UE 500 including a PoC client 502, to which exemplary embodiments of the present invention are applied.

The PoC UE 500 may include the PoC client 502, a user interface unit 801, and a data transmission unit 804.

In particular, according to an exemplary embodiment of the present invention, when the PoC client 502 receives a re-INVITE or INVITE message from a participating PoC server of a PF after establishing a pre-established session with the participating PoC server, the PoC client 502 compares and checks Call IDentifiers (IDs), originating numbers (from-tag), and terminating numbers (to-tag) between the received message and the pre-established session. When it is determined that the Call ID, originating number, and terminating number of the received message are the same as those of the pre-established session, the terminating-side PoC client stores a pre-established session ID and information about media parameters. In this case, a PoC session ID is transferred to the terminating-side PoC client through a conference URI of the INVITE message, and is temporarily stored as information constituting the PoC session. Thereafter, the terminating-side PoC client transmits a 200 OK message through the PF entity so as to participate in the PoC session.

In addition, when the PoC client is to terminate the PoC session after participating in the PoC session, as described above, the PoC client according to an exemplary embodiment of the present invention creates a REFER BYE message, which is a PoC termination request message, by using the pre-established session ID and the PoC session ID in order to terminate the PoC session while maintaining the pre-established session. That is, the PoC client creates a REFER BYE message by inserting the pre-established session ID into a Request-URI header of the REFER BYE message and inserting the PoC session ID into a Refer-To header. Then, the terminating-side PoC client transmits the created REFER BYE message to the PF entity.

The user interface unit 801 transfers user inputs to the PoC UE 500. The data transmission unit 804 transmits/receives packet data. The data transmission unit 804 may comprise transmission protocol stacks for performing transmission/reception of packet data. Such a data transmission unit 804 may include RTP/RTCP/HTTP, UDP, IP, and Lower Layer Stacks. The data transmission unit 804 may transmits/receives packet data with the PoC server 550 via the IP network 805 and IMS core network 806.

Meanwhile, the PoC server 550 according to an exemplary embodiment of the present invention is classified into the CF entity and the PF entity, and performs the operations of the CF entity and PF entity. The operations of the CF and PF entities according to an exemplary embodiment of the present invention will be described in detail with reference to FIGS. 9 and 10.

Hereinafter, a procedure in which a terminating side opens and terminates a PoC session while maintaining a pre-established session according to an exemplary embodiment of the present invention will be described with reference to a flow of signals shown in FIGS. 9 and 10. First, it is assumed in FIGS. 9 and 10 that a pre-established session has been established between a terminating-side PoC client and a terminating-side PoC server in steps 900 and 1000, respectively.

Figure 9:
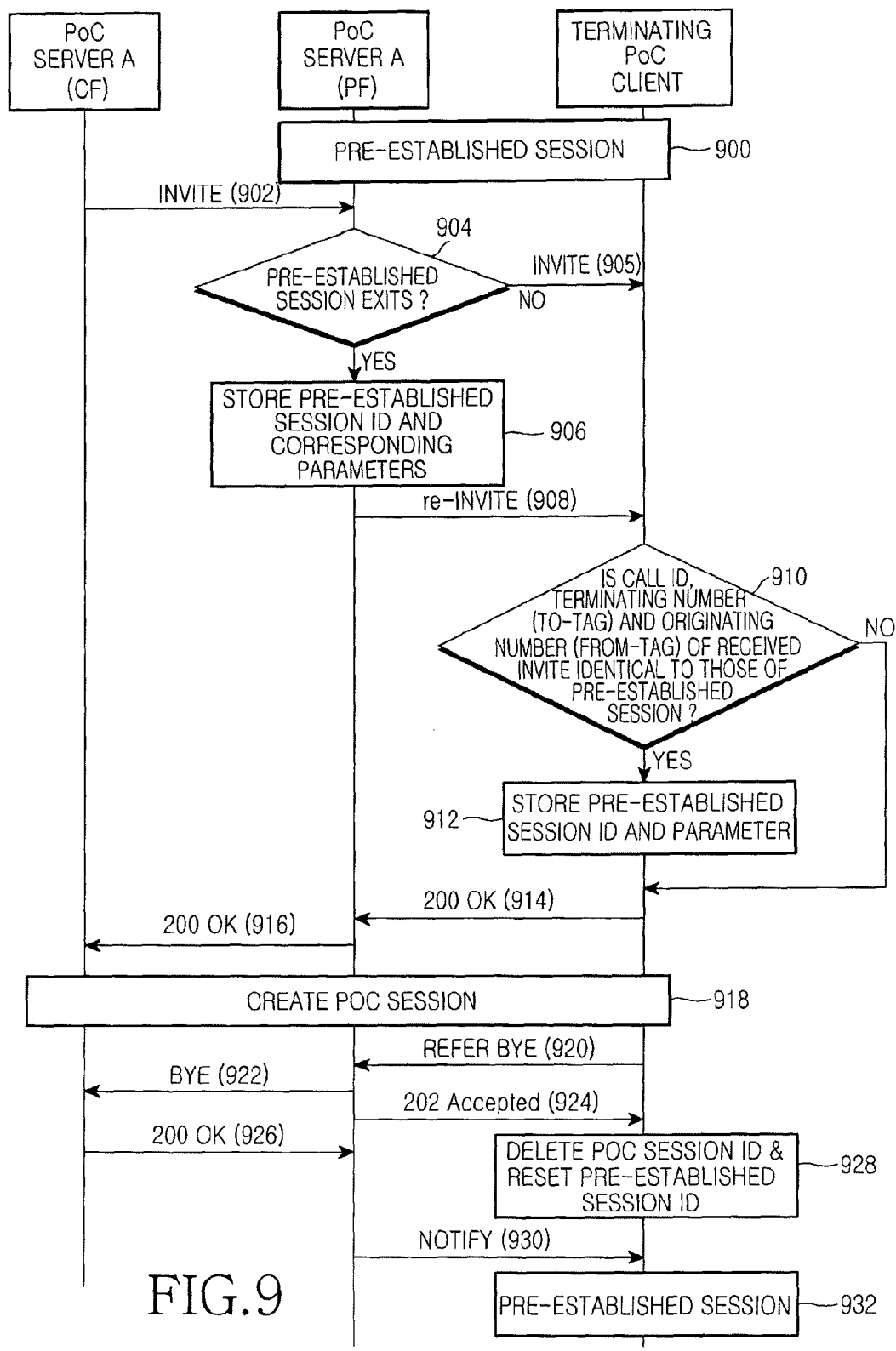
FIG. 9 is a flowchart illustrating a procedure in which a terminating side opens and terminates a PoC session while maintaining a pre-established session according to an exemplary embodiment of the present invention.
Figure 10:
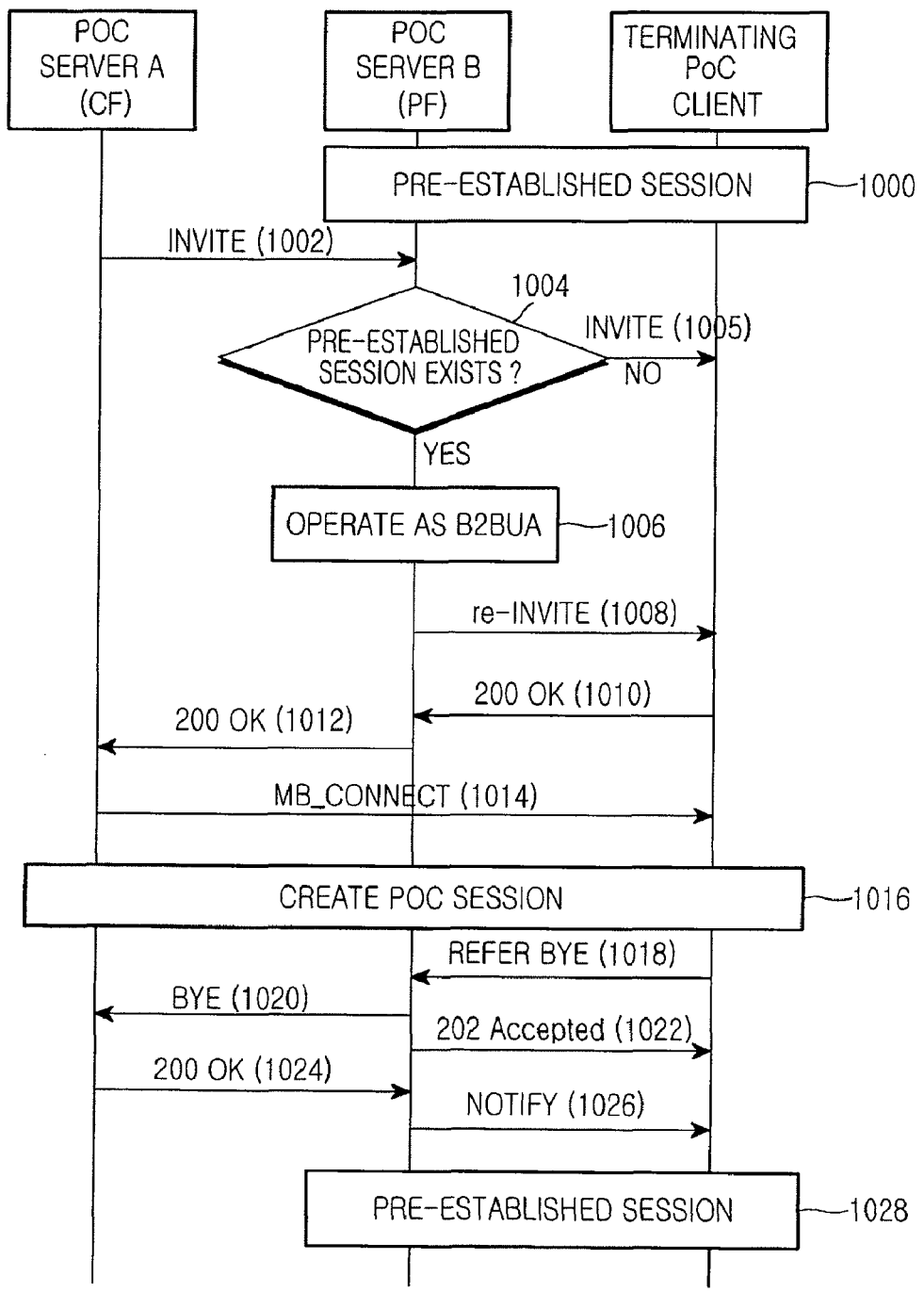
FIG. 10 is a flowchart illustrating a procedure in which a terminating side opens and terminates a PoC session while maintaining a pre-established session according to another exemplary embodiment of the present invention.

Referring to FIG. 9, an inviting PoC client (not shown) transmits an INVITE message to a PoC server A (CF entity) performing a controlling PoC function (CF) in order to invite a terminating-side PoC client to a PoC session. Then, the CF entity transmits the received INVITE message to a PoC server (PF entity) performing the PF in step 902.

Thereafter, the PF entity, having received the INVITE message, checks if there is a pre-established session established with the terminating-side PoC client in step 904. That is, the PF entity determines if there is a pre-established session established between the PF entity and the terminating-side PoC client.

When it is determined in step 904 that there is no pre-established session, the PF entity transmits the INVITE message to the terminating-side PoC client in step 905.

In contrast, when it is determined in step 904 that there is a pre-established session, the PF entity stores a pre-established session ID and corresponding media parameters in step 906, and enters a proxy mode, in which the PF entity transmits a re-INVITE message including a PoC session ID in a Contact header thereof to the terminating-side PoC client (step 908).

Then, after receiving the INVITE message or re-INVITE message, the terminating-side PoC client compares and checks Call IDs, originating numbers (from-tag), and terminating numbers (to-tag) between the received message and the pre-established session in step 910.

If it is determined that the Call ID, originating number, and terminating number in the received message are the same as those of the pre-established session, the terminating-side PoC client stores the pre-established session ID and information about media parameters in step 912. In this case, a PoC session ID included in the Contact header of the INVITE message is transferred to the terminating-side PoC client and is temporarily stored as information constituting the PoC session. If it is determined that the call ID, originating number, and terminating number in the received message are not the same as those of the pre-established session, step 912 is skipped.

Thereafter, the terminating-side PoC client transmits a 200 OK message to the CF entity via the PF entity in steps 914 and 916, thereby participating in the PoC session 918.

As described above, according to an exemplary embodiment of the present invention, in order to terminate a PoC session while keeping a pre-established session maintained when the terminating-side PoC client terminates the PoC session after participating in the PoC session, the terminating-side PoC client stores a PoC session ID and a pre-established session ID, that is, two IDs. Then, a method and procedure for terminating the PoC session while keeping a pre-established session maintained may be performed as shown in steps 920 to 932.

First, in order to terminate the PoC session with the while keeping the pre-established session maintained, the terminating-side PoC client creates a REFER message (REFER BYE message) which includes a BYE message requesting the ending of the PoC session by means of the pre-established session ID and the PoC session ID. That is, the terminating-side PoC client inserts the pre-established session ID into a Request-URI header of the REFER BYE message, and inserts the PoC session ID into a Refer-To header, thereby creating the REFER BYE message.

Thereafter, the terminating-side PoC client transmits the created REFER BYE message to the PF entity in step 920.

In addition, the PF entity, having received the REFER BYE message, transmits a 202 Accepted message, which is a response message representing that the PF entity has received and is processing the REFER BYE message, to the terminating-side PoC client in step 924. At this time, in order to restore the contact address information of the existing pre-established session, the terminating-side PoC client deletes the PoC session ID, and re-establishes the contact address information of the pre-established session by connecting the pre-established session ID with SIP dialog information between the PF entity and the PoC client in step 928.

In addition, the PF entity, having received the REFER BYE message, transfers the BYE message to the CF entity by using the PoC session ID in step 922. As a result, the PF releases the connection of the PoC session with the CF entity. In other words, although the terminating-side PoC client ends the PoC session, the session between the PF entity and the PoC client is not released, so that the pre-established session is maintained.

Meanwhile, the CF entity, having received the BYE message in step 922, transmits a 200 OK message to the PF entity in response to the BYE message in step 926, and then the PF entity receives the 200 OK message and transmits a NOTIFY message to the terminating-side PoC client in step 930. Through such operations, the terminating-side PoC client is notified that the PoC session has been terminated and the pre-established session between the PF entity and the terminating-side PoC client is maintained in step 932.

A procedure for terminating a PoC session while maintaining a pre-established session according to another exemplary embodiment of the present invention will now be described with reference to a flow of signals shown in FIG. 10.

When a CF entity transmits an INVITE message, which an inviting PoC client (not shown) has transmitted in order to invite a terminating-side PoC client to a PoC session, to a PF entity in step 1002, the PF entity determines if a pre-established session exists between the PF entity and the terminating-side PoC client in step 1004.

When it is determined in step 1004 that no pre-established session exists, the PF entity transmits the INVITE message to the terminating-side PoC client in step 1005.

In contrast, when it is determined in step 1004 that a pre-established session exists, the PF entity acts as a back-to-back user agent (B2BUA) in step 1006, and transmits a re-INVITE message, which is created by inserting a pre-established session ID into a Contact header thereof, to the terminating-side PoC client in step 1008. Here, acting as a B2BUA means that a server can optionally change parameters in a received INVITE message on a preset condition based on a network environment or services before transferring the INVITE message. Also, at this time, the PF entity internally connects the INVITE message received from the CF entity and the re-INVITE message transmitted to the terminating-side PoC client with each other, thereby connecting the two sessions to be one PoC session.

When receiving the re-INVITE message, the terminating-side PoC client maintains the pre-established session, and transmits a 200 OK message to the PF entity in response to the re-INVITE message in step 1010. Then, in step 1012, the PF entity transfers the 200 OK message to the CF entity in response to the INVITE message received from the CF. When receiving the 200 OK message, the CF entity transmits a Media burst connection (MB_CONNECT) message having the format of an Real-Time Transport Control Protocol application (RTCP APP) message to the terminating-side PoC client in order to transfer the PoC session ID in step 1014. In this case, the RTCP APP message is used for the user to optionally define and control a Real-time Transport Protocol (RTP) in an application transmitting the RTP.

By receiving a Media burst connection (MB_CONNECT) message as described above, the terminating-side PoC client can store both the pre-established session ID and the PoC session ID.

Then, a method and procedure for terminating the PoC session 1016 while maintaining the pre-established session may be performed as shown in steps 1018 to 1028.

Here, the operations of steps 1018, 1020, 1022, 1024, 1026, and 1028 are the same as those of steps 920, 922, 924, 926, 930, and 932 in FIG. 9, respectively. The method for ending a PoC session while keeping the pre-established session maintained according to said another exemplary embodiment of the present invention, shown in FIG. 10, is the same as that described with reference to FIG. 9, except that the method of FIG. 10 does not necessitate a step of deleting a PoC session ID and re-establishing a Contact address with the pre-established session ID because the pre-established session has been maintained from the beginning.

As described above, according to exemplary embodiments of the present invention, a PoC client stores both a PoC session ID and a pre-established session ID, even in a terminating side, and the PoC client creates a REFER BYE message by using the stored PoC session ID and pre-established session ID, and transmits the REFER BYE message to a PoC server when wanting to terminate a PoC session in which the PoC client is participating. The PoC client can terminate the PoC session while maintaining pre-established session, by using the PoC session ID and the pre-established session ID.

While the present invention has been shown and described with reference to certain exemplary embodiments thereof, it will be understood by those skilled in the art that various changes in form and details may be made therein without departing from the spirit and scope of the invention as defined by the appended claims and their equivalents. Accordingly, the scope of the present invention is not to be limited by the above embodiments but by the claims and the equivalents thereof.

What is claimed is:

1. A method for managing a pre-established session in a push-to-talk over cellular (PoC) server, the method comprising the steps of:
    establishing a pre-established session between a PoC user equipment (UE) and the PoC server;
    determining if there is a pre-established session between the PoC UE and the PoC server when a PoC session invitation request message is received from a first PoC server;
    storing a pre-established session ID according to the pre-established session when there is the pre-established session;
    transmitting, to the PoC UE, a PoC session re-invitation request message including the pre-established session ID;
    transmitting, to the PoC UE, a connection message including a PoC session ID; and
    transmitting, to the inviting PoC client, a PoC session termination message including information for terminating PoC session between the inviting PoC UE and the PoC UE, when a PoC session termination request message is received from the PoC UE,
    wherein the PoC session termination request message includes the information for terminating PoC session between the inviting PoC UE and the PoC server, and information for maintaining the pre-established session between the PoC UE and the PoC server.

2. The method as claimed in claim 1, further comprising:
    transmitting the PoC session invitation request message to the PoC UE when there is no pre-established session between the PoC server and the PoC UE.

3. The method as claimed in claim 1, further comprising:

terminating the PoC session between the PoC server and the inviting PoC client.

4. The method as claimed in claim 1, wherein the connection message has a format of a Real-Time Transport Control Protocol application (RTCP APP) message to the PoC UE in order to transfer the PoC session ID.

5. The method as claimed in claim 1, wherein the PoC session termination request message includes the pre-established session ID in a Request-URI header of session termination request message and the PoC session ID in a Refer-To header.

6. The method as claimed in claim 1, the PoC server acts as a back-to-back user agent (B2BUA).

7. A method for managing a pre-established session in a terminating-side Push-to-talk over Cellular (PoC) User Equipment (UE), the method comprising:
   establishing a pre-established session between the PoC UE and a PoC server;
   receiving, from the PoC server, a PoC session re-invitation request message including a pre-established session ID according to the pre-established session;
   receiving, from a first PoC server, a connection message including a PoC session ID;
   participating in the PoC session between the inviting PoC UE and the PoC client; and
   transmitting, to the PoC server, a PoC session termination request message for terminating the PoC session between the inviting PoC UE and the PoC server,
   wherein the PoC session termination request message includes the information for terminating the PoC session between the inviting PoC UE and the PoC server, and information for maintaining the pre-established session between the PoC UE and the PoC server.

8. The method as claimed in claim 7, further comprising: storing the pre-established session ID and the corresponding media parameter.

9. The method as claimed in claim 7, wherein the connection message has a format of a Real-Time Transport Control Protocol application (RTCP APP) message to the PoC UE in order to transfer the PoC session ID.

10. The method as claimed in claim 7, further comprising: generating the PoC session termination request message by inserting the pre-established session ID into a Request-URI header of the PoC session termination request message and inserting the PoC session ID into a Refer-To header.

11. The method as claimed in claim 7, further comprising: transmitting, to the PoC server, a response message in response to the PoC session re-invitation request message.

12. A Push-to-talk over Cellular (PoC) User Equipment (UE) for managing a pre-established session in a PoC system, the PoC UE comprising:
   a user interface unit for outputting a signal according to an input of a PoC user;
   a data transmission unit for at least one of transmitting and receiving packet data; and
   a PoC client for establishing a pre-established session between the PoC UE and a PoC server, for receiving, from the PoC server, a PoC session re-invitation request message including a pre-established session ID according to the pre-established session, for receiving, from a first PoC server, a connection message including a PoC session ID, for participating in the PoC session between the inviting PoC UE and the PoC client; and for transmitting, to the PoC server, a PoC session termination request message for terminating the PoC session between the inviting PoC UE and the PoC UE.

13. The PoC UE as claimed in claim 12, wherein the PoC client stores the pre-established session ID and the corresponding media parameter.

14. The PoC UE as claimed in claim 12, wherein the connection message has a format of a Real-Time Transport Control Protocol application (RTCP APP) message to the PoC UE in order to transfer the PoC session ID.

15. The PoC UE as claimed in claim 12, wherein the PoC client generates the PoC session termination request message by inserting the pre-established session ID into a Request-URI header of the PoC session termination request message and inserting the PoC session ID into a Refer-To header.

16. The PoC UE as claimed in claim 12, wherein the PoC client transmits, to the PoC server, a response message in response to the PoC session re-invitation request message.

* * * * *